(12) United States Patent
Lee et al.

(10) Patent No.: US 7,677,482 B2
(45) Date of Patent: Mar. 16, 2010

(54) ELECTRIC CHARGE CONCENTRATION TYPE DROPLET DISPENSING DEVICE HAVING NONCONDUCTIVE CAPILLARY NOZZLE

(75) Inventors: Beom-seok Lee, Yongin-si (KR);
Jeong-gun Lee, Yongin-si (KR);
Hye-jung Cho, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 195 days.

(21) Appl. No.: 11/781,714

(22) Filed: Jul. 23, 2007

(65) Prior Publication Data
US 2008/0017736 A1 Jan. 24, 2008

(30) Foreign Application Priority Data
Jul. 21, 2006 (KR) ............. 10-2006-0068407
Feb. 9, 2007 (KR) ............. 10-2007-0013979

(51) Int. Cl.
*B05B 5/00* (2006.01)
(52) U.S. Cl. .......... 239/695; 239/304; 239/333; 239/690; 239/708; 222/420; 250/288
(58) Field of Classification Search .......... 239/304, 239/320, 333, 690, 695, 696, 708; 222/420; 250/288
See application file for complete search history.

(56) References Cited

U.S. PATENT DOCUMENTS 5,423,964 A * 6/1995 Smith et al. .......... 250/288
5,917,184 A * 6/1999 Carson et al. .......... 250/288
6,657,191 B2 * 12/2003 Park .......... 250/288
6,911,132 B2 * 6/2005 Pamula et al. .......... 239/690
6,977,372 B2 * 12/2005 Valaskovic et al. .......... 250/288
2002/0003177 A1 * 1/2002 O'Connor et al. .......... 239/696

FOREIGN PATENT DOCUMENTS

EP 1752213 A 2/2007
WO WO 0171311 A 9/2001

OTHER PUBLICATIONS

EPO Search Report dated May 15, 2008; Appl. No. EP 07 11 0102 (all references cited therein are listed above).

* cited by examiner

*Primary Examiner*—Steven J Ganey
(74) *Attorney, Agent, or Firm*—Cantor Colburn LLP

(57) ABSTRACT

Provided is a droplet dispensing device having a nonconductive capillary nozzle. The droplet dispensing device comprises: a nonconductive capillary nozzle disposed in a downward position; a pump connected with the nonconductive capillary nozzle through a hermetically sealed fluid tube and generating a negative pressure to decrease the influence of gravity on a solution within the nonconductive capillary nozzle and the fluid tube; and an open circuit voltage supplier applying a voltage to the solution. The droplet dispensing device supplies the solution by capillary force to regularly maintain the shape of a droplet surface in the tip of the nonconductive capillary nozzle without using a separate driving device.

19 Claims, 15 Drawing Sheets

ELECTRIC CHARGE CONCENTRATION TYPE DROPLET DISPENSING DEVICE HAVING NONCONDUCTIVE CAPILLARY NOZZLE

CROSS-REFERENCE TO RELATED PATENT APPLICATION

This application claims priority to Korean Patent Application No. 10-2006-0068407, filed on Jul. 21, 2006, and Korean Patent Application No. 10-2007-0013979, filed on Feb. 9, 2007, and all the benefits accruing therefrom under 35 U.S.C. §119, the content of which are incorporated herein by reference in their entirety.

BACKGROUND OF THE INVENTION

1. Field of the Invention

The present invention relates to an electric charge concentration (ECC) type droplet dispensing device having a nonconductive capillary nozzle.

2. Description of the Related Art

A droplet dispensing device is a device that discharges very small droplets of a solution on a substrate, a film, a recoding medium, or the like. There are various methods of discharging droplets. For example, an inkjet method is used in an inkjet printer. However, in the inkjet method, a solution (e.g., ink) is heated, and thus, the method is not suitable for discharging a thermally sensitive solution. Specifically, when droplets of a solution containing biomolecules such as nucleic acids, proteins, biocells, viruses, bacteria, and the like, are discharged in the fabrication of biochips, a droplet dispensing device capable of discharging the droplets without heating the solution is advantageous.

A device for discharging droplets of a picoliter size using ultrasonic energy has been developed by Labcyte Inc. However, there remains a need for a droplet dispensing device that has better durability and high operation speed, and can discharge droplets of uniform size, and be miniaturized.

SUMMARY OF THE INVENTION

Provided herein is a droplet dispensing device capable of discharging fine droplets in response to an electrical control signal using an immersed electrode and a nonconductive capillary nozzle.

Also provided herein is a droplet dispensing device capable of regularly maintaining the shape of the droplet surface in the tip of the nozzle without using a separate driving device by preventing the influence of gravity on the capillary nozzle and supplying the solution by capillary force.

According to an embodiment, there is provided a droplet dispensing device comprising: a nonconductive capillary nozzle disposed in a downward direction; a pump connected with the nonconductive capillary nozzle through a hermetically sealed fluid tube and generating a negative pressure to decrease the influence of gravity on a solution within the nonconductive capillary nozzle and the fluid tube; and an open circuit voltage supplier applying a voltage to the solution.

In order to apply a voltage to the solution, for example, an electrode may be immersed in the solution within the fluid tube and connected with the open circuit voltage supplier. An electrode may be disposed within the nonconductive capillary nozzle and connected with the open circuit voltage supplier. Alternatively, a second electrode may be immersed in the solution within the fluid tube or the nonconductive capillary nozzle and a first electrode may be disposed outside the fluid tube or the nonconductive capillary nozzle and connected with the open circuit voltage supplier to generate induced electric force to the second electrode. The inside diameter of the fluid tube may be larger than the inside diameter of the nonconductive capillary nozzle.

The droplet dispensing device may further comprise a solution reservoir between the fluid tube and the nonconductive capillary nozzle. In this case, an electrode may be immersed within the solution reservoir and connected with the open circuit voltage supplier. Also, a second electrode may be immersed in the solution within the solution reservoir and a first electrode may be disposed outside the solution reservoir and connected with the open circuit voltage supplier to generate an induced electric force to the second electrode.

At least an inner wall of the nonconductive capillary nozzle may be hydrophilic and a tip portion of the nonconductive capillary nozzle may comprise a tip coating portion formed of a hydrophobic material, if necessary.

The pump may be a syringe pump. In this case, the syringe pump may be maintained in a position so that the solution is drawn up in the fluid tube or the solution reservoir.

According to another aspect of the present invention, there is provided a droplet dispensing device comprising: a solution reservoir; at least one nonconductive capillary nozzle disposed in a downward direction with respect to the solution reservoir; a pump connected to the solution reservoir through a hermetically sealed fluid tube and generating a negative pressure to decrease the influence of gravity on a solution within the nonconductive capillary nozzle and the solution reservoir; and an open circuit voltage supplier applying a voltage to the solution.

Herein, in order to apply a voltage to the solution, an electrode may be immersed within the solution reservoir and connected with the open circuit type voltage supplier. Alternatively, an electrode may be immersed within the nonconductive capillary nozzle and connected with the open circuit voltage supplier. Also, a second electrode may be immersed in the solution within the solution reservoir and a first electrode may be disposed outside the solution reservoir and connected with the open circuit type voltage supplier to generate an induced electric force to the second electrode.

At least an inner wall of the nonconductive capillary nozzle may be hydrophilic and a tip portion of the nonconductive capillary nozzle may comprise a tip coating portion formed of a hydrophobic material, if necessary.

The pump may be a syringe pump. In this case, the syringe pump may be maintained in a position so that the solution is drawn up to the fluid tube or the solution reservoir.

According to another aspect of the present invention, there is provided a droplet dispensing device comprising: a plurality of droplet dispensing units, each droplet dispensing unit comprising: a solution reservoir and a nonconductive capillary nozzle disposed in a downward direction with respect to the droplet dispensing unit; a pump connected to the solution reservoirs through a hermetically sealed fluid tube and generating a negative pressure to decrease the influence of gravity on solutions within the droplet dispensing units; and an open circuit voltage supplier applying a voltage to the solutions within the droplet dispensing units.

Herein, in order to apply a voltage to the solution, electrodes may be immersed in the solutions within the solution reservoirs and connected with the open circuit voltage supplier. Alternatively, electrodes may be immersed in the solutions within the nonconductive capillary nozzle and connected with the open circuit voltage supplier. The droplet dispensing device may further comprise a switching unit selectively connecting some of the immersed electrodes with the open circuit type voltage supplier.

Also, a plurality of second electrodes may be immersed in the solutions within the solution reservoirs, and a plurality of first electrodes may be disposed outside the solution reservoirs and connected with the open circuit voltage supplier to generate an induced electric force to the second electrodes. The droplet dispensing device may further comprise a switching unit selectively connecting some of the first electrodes with the open circuit voltage supplier.

At least inner walls of the nonconductive capillary nozzles may be hydrophilic and each of the tip portions of the nonconductive capillary nozzles may comprise a tip coating portion formed of a hydrophobic material, if necessary.

The pump may be a syringe pump. In this case, the syringe pump may be maintained in a position so that the solution is drawn up to the fluid tube or the solution reservoir.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
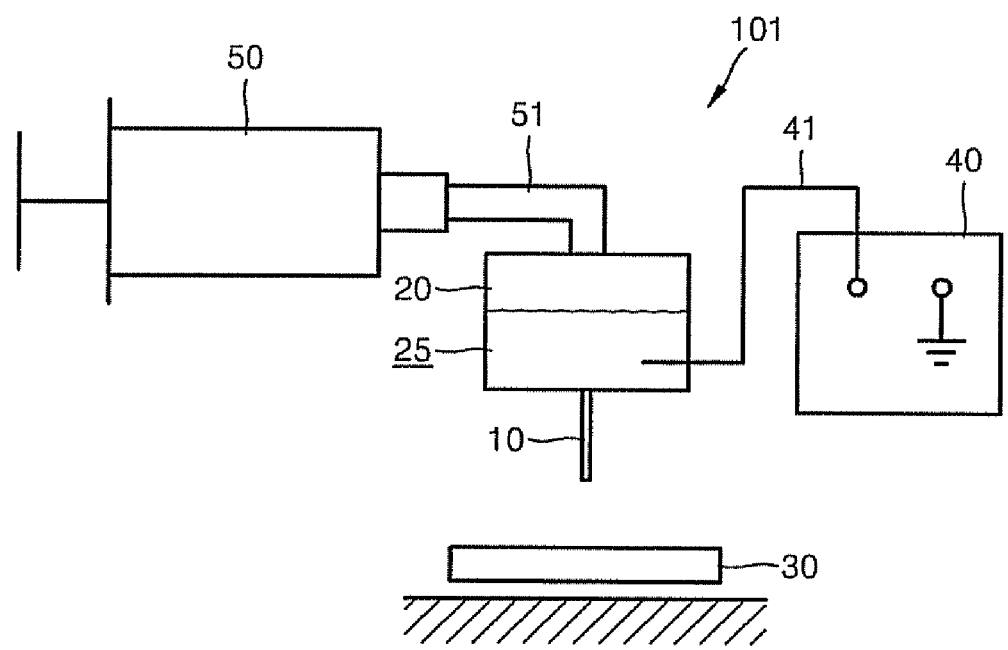
FIG. 1 is a schematic view of an exemplary droplet dispensing device having a syringe pump and a solution reservoir.

The invention is described more fully hereinafter with reference to the accompanying drawings, in which embodiments of the invention are shown. This invention, however, should not be construed as limited to the embodiments set forth herein. Rather, these embodiments are provided to convey the scope of the invention to those skilled in the art. In the drawings, the size and relative sizes of elements and regions may be exaggerated for clarity.

It will be understood that when an element or layer is referred to as being "on," "connected to," "inside," "outside," "below," or "above" another element or layer, it can be directly on, connected to, inside, outside, below, or above the other element or layer or intervening elements or layers may be present. In contrast, when an element is referred to as being "directly on," or "directly connected to," there are no intervening elements or layers present.

Like numbers refer to like elements throughout.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, first element, component, region, layer or section discussed below could be termed second element, component, region, layer or section without departing from the teachings of the present invention.

Spatially relative terms, such as "below," "above," "up," "down," "downward," "vertically," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

As used herein, the singular forms "a," "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is a schematic view of a droplet dispensing device 101 having a syringe pump 50 and a solution reservoir 20 comprising a bottom. The solution reservoir 20 stores a solution 25 to be dispensed. A nonconductive capillary nozzle 10 comprising a tip is disposed at the bottom of the solution reservoir 20. The solution reservoir 20 is connected with the syringe pump 50 through a fluid tube 51. An immersed electrode (not shown) is disposed within the solution reservoir 20 and the immersed electrode is connected with an output terminal of an open circuit voltage supplier 40 through a lead line 41. Herein, the immersed electrode is not necessarily disposed as a separate member, and may be an end portion of the lead line 41 immersed in the solution 25. A target member 30, upon which a droplet discharged from the nonconductive capillary nozzle 10 is received, may be spaced from the tip of the nonconductive capillary nozzle 10 by a predetermined distance. As used herein, "predetermined distance" refers to the distance where charges having polarity opposite to charges accumulated in the solution surface in the tip of the nonconductive capillary nozzle 10 are induced to the surface of the target member 30 and the Coulomb force between the charges becomes larger than the surface tension of the solution to be discharged in fine droplets onto the target member 30. Therefore, the predetermined distance may vary according to various factors such as the intensity of the applied voltage, the electrolyte concentration of the solution, the surface tension of the solution, or the like.

The solution reservoir 20 is disposed between the fluid tube 51 and the nonconductive capillary nozzle 10, and is a container that is strongly and hermetically sealed such that the inside of the container is not affected by atmospheric pressure. The fluid tube 51 may be a member such as a hermetically sealed tube, pipe, or the like, having enough rigidity to prevent contraction due to internal negative pressure. The syringe pump 50 is an example of a pump that can generate negative pressure, that is, lower pressure than atmospheric pressure in the solution reservoir 20 and the fluid tube 51. However, the present invention is not limited thereto. The negative pressure generated by the syringe pump 50 decreases the effect of gravity on the solution within the solution reservoir 20 and the nonconductive capillary nozzle 10. That is, the negative pressure offsets the hydraulic pressure due to a height difference between the tip of the nonconductive capillary nozzle 10 and the surface of the solution 25 stored within the solution reservoir 20.

The nonconductive capillary nozzle 10 may be formed of any electrically insulating material, hydrophilic material, or a combination thereof. While it is advantageous for the nonconductive capillary nozzle 10 to be formed of glass, a material that can be electrically insulating and hydrophilic, it is not limited thereto. At least a capillary inner wall of the nonconductive capillary nozzle 10 may be formed of a hydrophilic or hydrophilic-processed material so that the nonconductive capillary nozzle 10 may have a hydrophilic property. Accordingly, the droplet dispensing device of the present invention can supply the solution to the tip of the nonconductive capillary nozzle 10 using capillary force without using a separate actuator when dispensing the solution. Since the nonconductive capillary nozzle 10 is electrically insulating, charges can be concentrated on the surface of the solution formed in the tip rather than in the nonconductive capillary nozzle 10. Therefore, the nonconductive capillary nozzle 10 is advantageous to control the discharging position and direction of a droplet.

The open circuit voltage supplier 40 may apply a voltage of a predetermined waveform to the solution 25 through the lead line 41 and the immersed electrode. The predetermined waveform may be a direct current (DC) waveform, an alternating current (AC) waveform, such as a sinusoidal waveform and a triangle waveform, a pulse of various types, or a combination thereof. The waveform and the intensity of the applied voltage may vary according to the size of the droplet and the properties of the solution to be printed. The open circuit voltage supplier 40 supplies charges to the solution 25 within the nonconductive capillary nozzle 10.

When the droplet dispensing device is used to fabricate biochips or DNA micro arrays, the target member 30 may be a substrate comprising silicon, glass, a polymer, or a combination thereof, however, the target member 30 is not limited thereto. A droplet discharged from the tip of the nonconductive capillary nozzle 10 adheres on a surface of the target member 30. The surface of the target member 30 may be coated with a material comprising an amine group, a carboxyl group, streptavidin, biotin, a thiol, Poly-L-Lysine, or a combination thereof, to improve the adhesion of biomolecules in the droplet.

The droplet dispensing operation of the device 101 of the present embodiment will now be described. Before dispensing the solution 25, a negative pressure is generated within the solution reservoir 20 and the fluid tube 51 to draw up the solution 25 using the syringe pump 50. When the drawn up solution 25 reaches a certain height, the pressure of the solution applied to the tip of the nonconductive capillary nozzle 10 is approximately the same as a difference between the atmospheric pressure and the pressure within the solution reservoir 20. Since the inner wall of the nonconductive capillary nozzle 10 is hydrophilic, a capillary pressure is applied toward the tip. The solution 25 moved to the tip of the nonconductive capillary nozzle 10 by the capillary pressure does not drop down but reaches a certain surface shape due to the surface tension of the solution 25. The shape of the solution surface may vary according to the degree of hydrophilicity of the inner wall of the nonconductive capillary nozzle 10 and the surface of the tip.

When a voltage is applied to the solution 25 by the open circuit voltage supplier 40, charges are concentrated on the solution surface in the tip of the nonconductive capillary nozzle 10, and simultaneously, charges of opposite polarity are induced onto the surface of the target member 30. At this time, when the electrical attraction generated between the solution surface in the tip of the nonconductive capillary nozzle 10 and the surface of the target member 30, that is, the Coulomb force, becomes larger than the surface tension between the solution 25 and air, a droplet is discharged toward the target member 30. The volume of the discharged droplet is measured in picoliters (pL), nanoliters (nL), or femtoliters (fL). The operating principle of an ECC type droplet dispensing device is briefly described herein and is described in detail in Korean Patent Application No. 2005-74496.

When a droplet is discharged as described above, a solution amount corresponding to the volume of the discharged droplet is supplied to the tip of the nonconductive capillary nozzle 10 by the capillary pressure to recover the initial shape of the solution surface. Not wishing to be bound by theory, but it is believed that the level of the solution 25 within the solution reservoir 20 may be lowered to correspond to the volume of the discharged droplet, and thus the negative pressure within the solution reservoir 20 may become higher than the pressure of the solution 25. However, since the volume of the solution reservoir 20 is very large in comparison to the volume of the discharged droplet, a change in the level of the solution 25 is extremely small. Therefore, in a general dispensing operation, the shape of the solution surface at the tip of the nonconductive capillary nozzle 10 may be regularly maintained.

Figure 2:
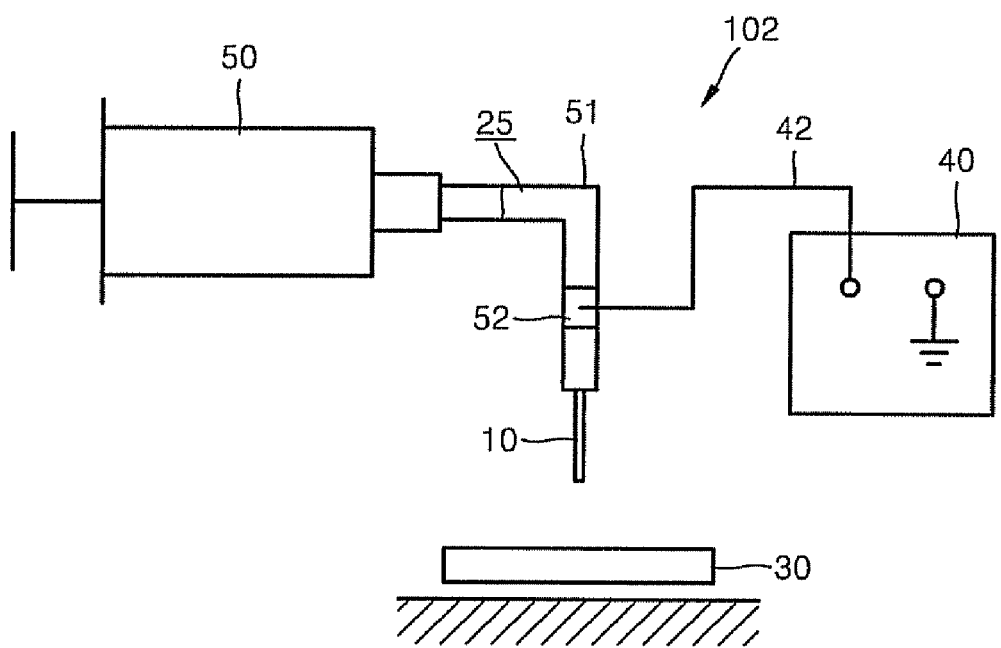
FIG. 2 is a schematic view of an exemplary droplet dispensing device having an electrode immersed in a fluid tube.

FIG. 2 is a schematic view of a droplet dispensing device 102 having an electrode 52 immersed in a fluid tube 51, according to another embodiment. The device 102 of the present embodiment, in comparison to the device 101 of the embodiment illustrated in FIG. 1, does not comprise the solution reservoir 20 and comprises the electrode 52 immersed in the fluid tube 51, and the electrode 52 is connected with an open circuit voltage supplier 40 through a lead line 42. The electrode 52 may be, for example, a metal tube disposed in a section of the fluid tube 51. Alternatively, the electrode 52 may be a metal leaf disposed in a section of the inner wall of the fluid tube 51 or may be an end portion of the lead line 42 immersed in a solution within the fluid tube 51.

The fluid tube 51 may be a member such as a hermetically sealed tube, pipe, or the like, having enough rigidity to prevent the fluid tube 51 from contracting due to internal negative pressure. The fluid tube 51 may have a larger cross-section than that of the nonconductive capillary nozzle 10. When both the fluid tube 51 and the nonconductive capillary nozzle 10 have the shape of a tube or pipe, the diameter of the fluid tube 51 may be larger than that of the nonconductive capillary nozzle 10. The nonconductive capillary nozzle 10, syringe pump 50, open circuit type voltage supplier 40, and target member 30 are described above with reference to FIG. 1.

Figure 3:
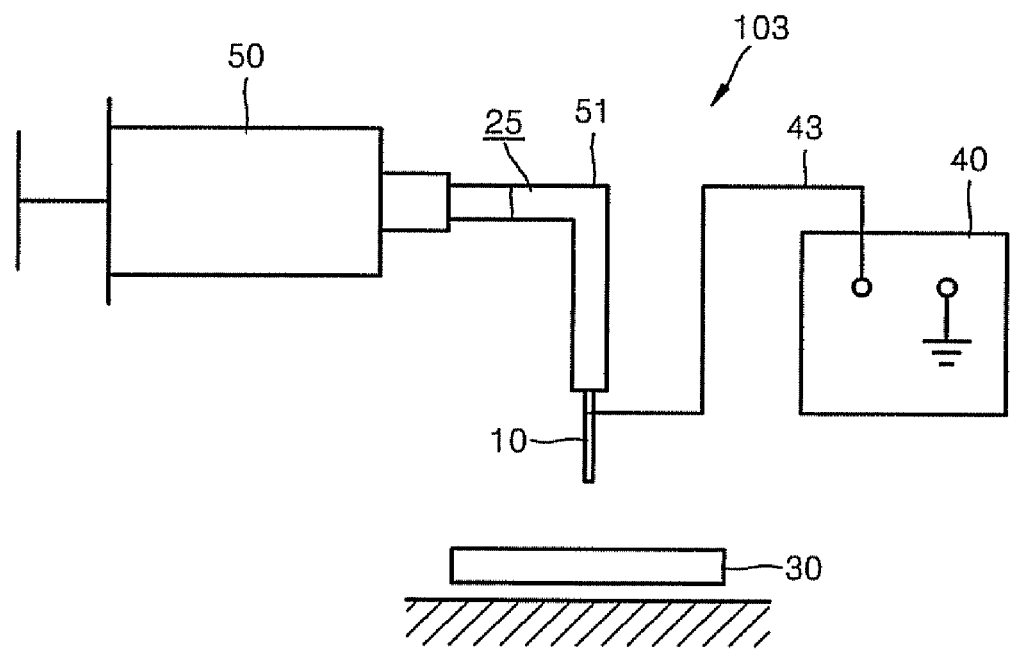
FIG. 3 is a schematic view of an exemplary droplet dispensing device having an electrode immersed in a nonconductive nozzle.

FIG. 3 is a schematic view of a droplet dispensing device 103 having an electrode (not shown) immersed in a nonconductive capillary nozzle 10, according to another embodiment. The droplet dispensing device 103 of the present embodiment, in comparison to the droplet dispensing device 102 of FIG. 2, comprises a lead line 43 connected with an open circuit voltage supplier 40, wherein the lead line 43 comprises an end portion that is immersed in a solution through a part of the nonconductive capillary nozzle 10. The electrode may be disposed in a part of the inner wall of the nonconductive capillary nozzle 10 and may be connected with the open circuit voltage supplier 40 through the lead line 43.

Figure 4:
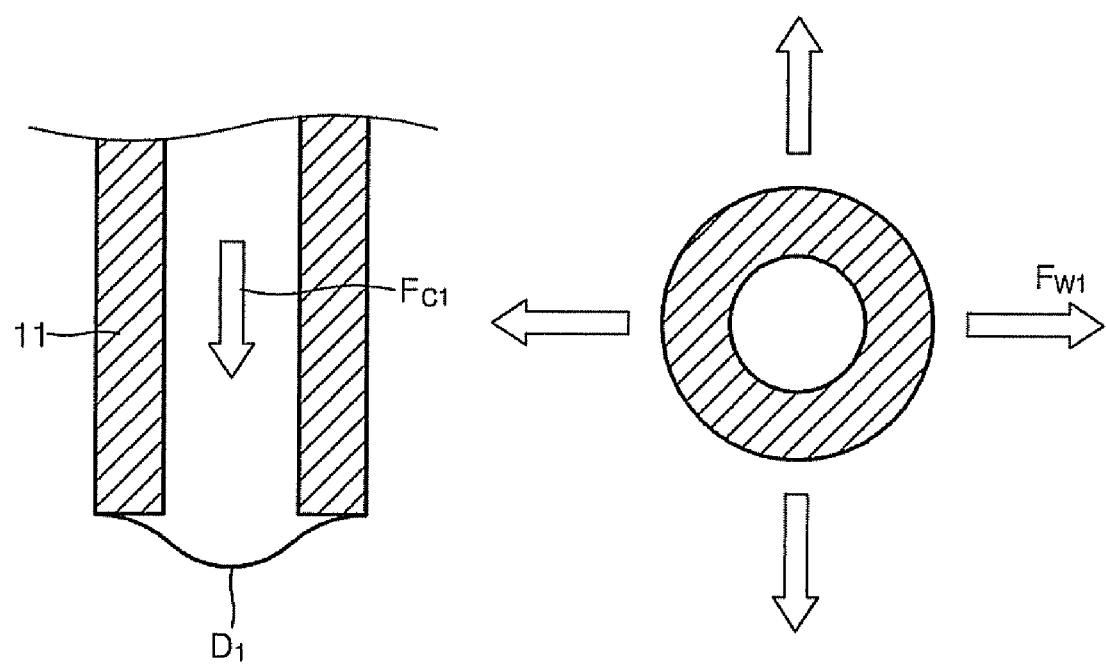
FIG. 4 is a sectional view of an exemplary nonconductive glass capillary nozzle.
Figure 5:
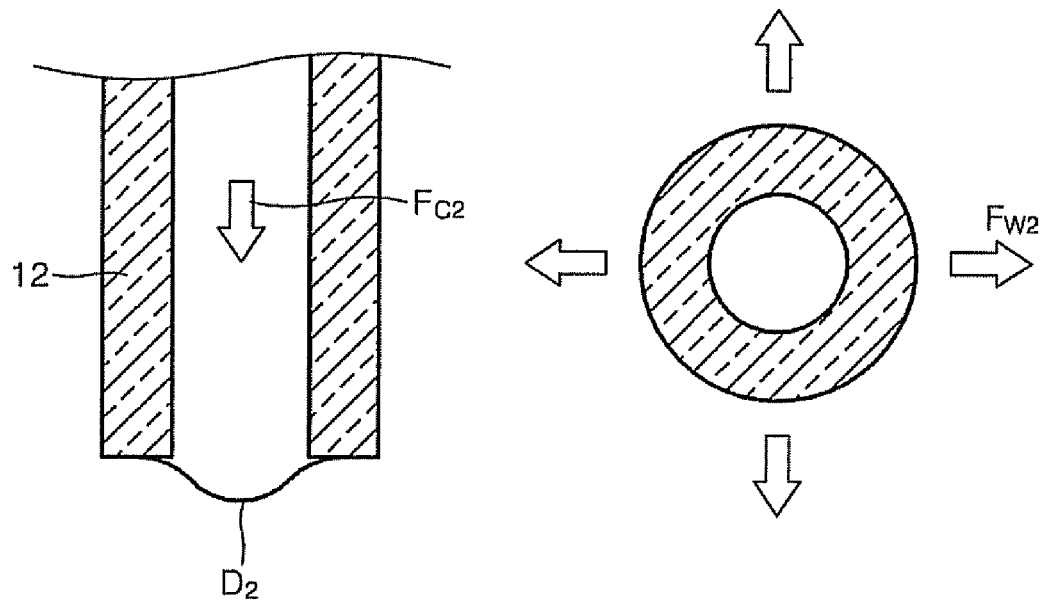
FIG. 5 is a sectional view of an exemplary stainless steel conductive capillary nozzle.

FIG. 4 is a sectional view of a nonconductive capillary nozzle 11 formed of glass according to an embodiment, and FIG. 5 is a sectional view of a conductive capillary nozzle 12 formed of stainless steel. The capillary nozzle 11 formed of glass is electrically insulating and has higher hydrophilicity in comparison to the capillary nozzle 12 formed of stainless steel. Therefore, the capillary force Fc1 within the glass capillary nozzle 11 is larger than the capillary force Fc2 within the stainless steel capillary nozzle 12. Also, in the tips of the capillary nozzles 11 and 12, the wetting force Fw1 of the glass capillary nozzle 11 is larger than the wetting force Fw2 of the stainless steel capillary nozzle 12. Thus, when the capillary nozzles 11 and 12 are used in the devices of FIGS. 1 through 3, the shape of the surface of solution 25 formed at the tips may vary as illustrated by D1 and D2 in FIGS. 4 and 5. Since surface lowering of D1 is larger than that of D2, the glass capillary nozzle 11 is more advantageous to the droplet discharge.

Figure 6:
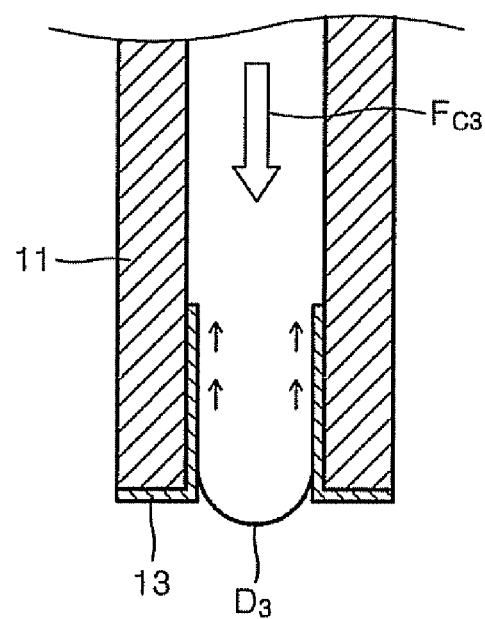
FIG. 6 is a sectional view of an exemplary nonconductive glass capillary nozzle having a tip coated with a hydrophobic material.

FIG. 6 is a sectional view of a nonconductive capillary nozzle 11 formed of glass and having a tip coated with a hydrophobic material. The nonconductive capillary nozzle 11 comprises a tip coating 13 comprising Indium-Tin-Oxide (ITO). A capillary force Fc3 within the nonconductive capillary nozzle 11 is similar to the capillary force Fc1 within the glass capillary nozzle 11 of FIG. 4. When a solution reaches the tip, a capillary resistance is generated, as represented by small arrows, due to the hydrophobicity of the tip coating 13. However, since the capillary force Fc3 is larger than the capillary resistance, the solution can reach the tip of the nonconductive capillary nozzle 10. The solution that reaches the tip forms a solution surface of a shape D3 by a large contact angle with the tip coating 13. The surface shape D3 can recover its initial shape in a shorter time after droplet discharge in comparison to D1, and thus can advantageously decrease the time interval of the drop discharge.

Figure 7:
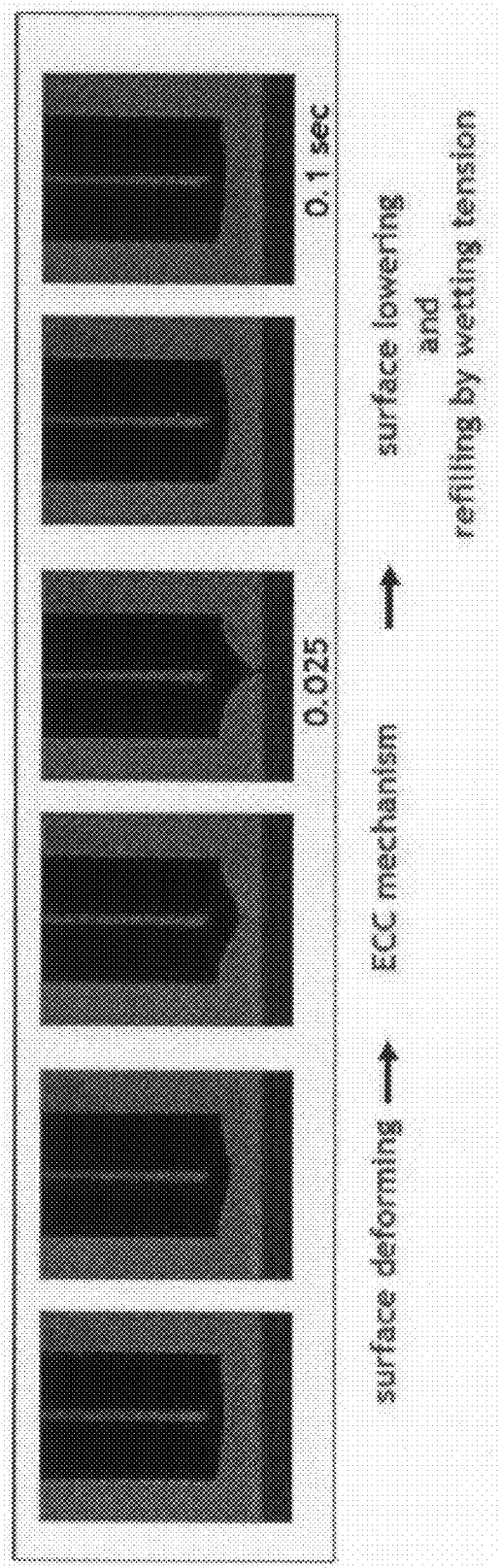
FIG. 7 illustrates a droplet being dispensed by the droplet dispensing device illustrated in FIG. 1.

FIG. 7 illustrates a droplet being dispensed by the droplet dispensing device illustrated in FIG. 1. The nonconductive capillary nozzle 10 is disposed vertically and downward from an upper portion and the surface of the target member 30 is disposed in a lower portion. A solution is supplied by the capillary pressure to form the surface shape as illustrated in the leftmost picture. As charges are concentrated on the solution surface and charges having opposite polarity are induced on the target member 30, a droplet is discharged in 0.025 seconds. The solution surface is recovered to its initial shape in 0.1 seconds. In this case, a sinusoidal wave of 10 Hz (amplitude: 2.5 kV, offset: 1.2 kV) is applied to the solution 25 from the open circuit voltage supplier 40 (not shown).

The nonconductive capillary nozzle 10, used in the embodiments illustrated in FIGS. 7-25, is made of glass and has an external diameter of 1.5 mm and an inside diameter of 1.0 mm. It can be seen from FIG. 7 that a much smaller droplet than the external diameter of the nonconductive capillary nozzle 10 is discharged. The nonconductive capillary nozzle 10 is transparent, and thus is advantageous for observing the flow that occurs within the nonconductive capillary nozzle 10 during the droplet discharge. In particular, when the discharged solution comprises large-sized biomolecules or cells, their movement can be observed when the flow occurs within the nonconductive capillary nozzle 10.

Figure 8A:
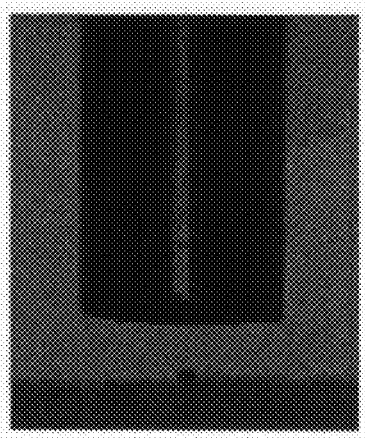
FIGS. 8A through 8C illustrate droplets of various volumes dispensed by the droplet dispensing device illustrated in FIG. 1.
Figure 8B:
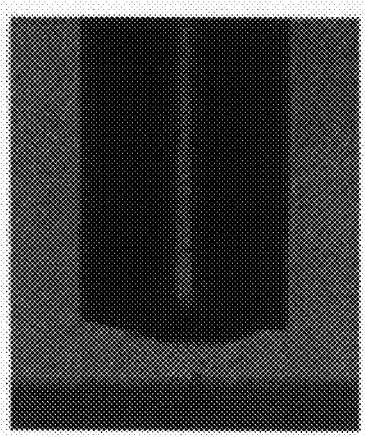
Figure 8C:
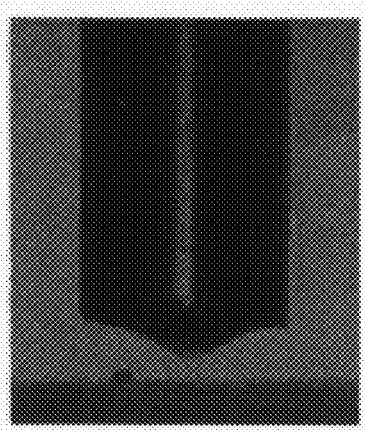

FIGS. 8A through 8C illustrate droplets of various volumes dispensed by the droplet dispensing device illustrated in FIG. 1. The nonconductive capillary nozzle 10 described above was used, and a cover glass is used as the target member 30. FIGS. 8A, 8B, and 8C illustrate that droplets of 1 nL, 12 pL, and 300 fL are discharged, respectively. The droplet dispensing device of FIG. 1 can discharge droplets of various sizes according to the waveform and the intensity of the voltage applied from the open circuit voltage supplier 40 (not shown).

Figure 9:
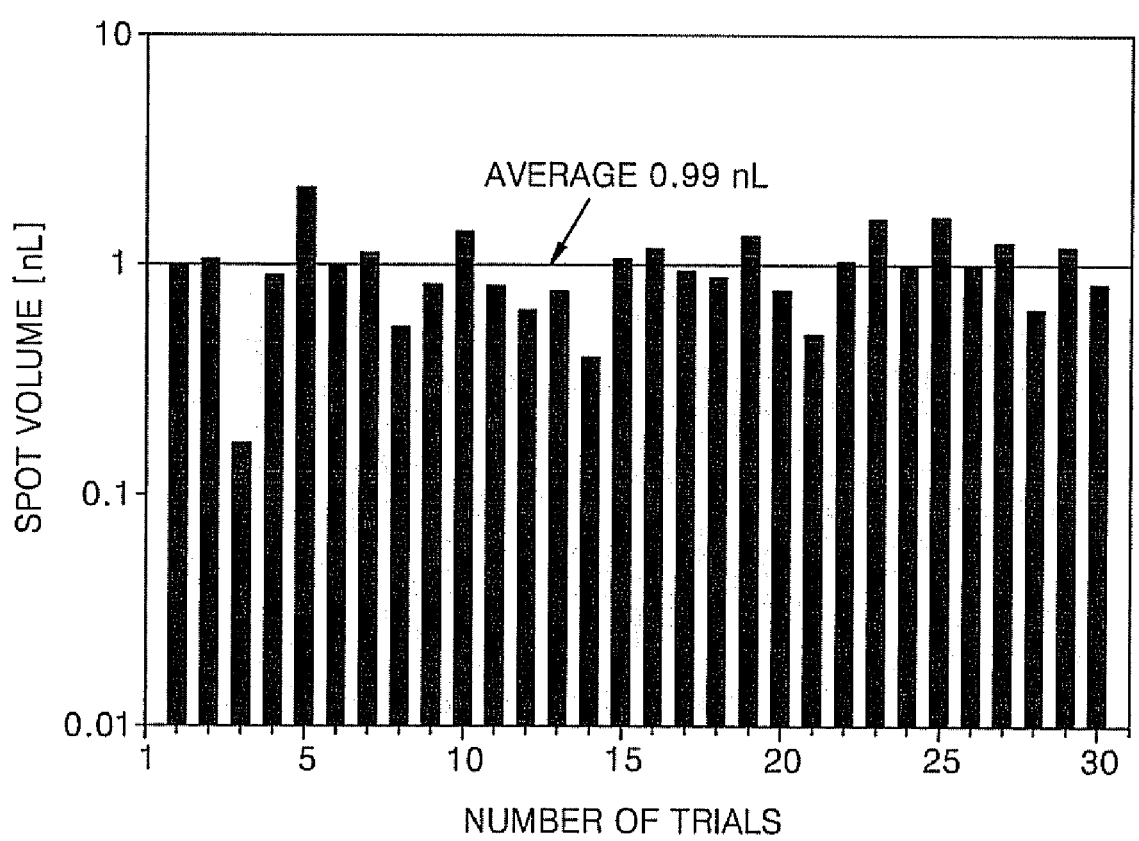
FIG. 9 is a graph illustrating the volume distribution of droplets dispensed by the droplet dispensing device of FIG. 1.

FIG. 9 is a graph illustrating the volume distribution of droplets dispensed by the droplet dispensing device of FIG. 1. 30 drops having a volume of 1 nL are dispensed under the conditions described for FIG. 8A above. It can be seen from FIG. 9 that droplets having an average volume of 0.99 nL can be discharged with a small deviation.

Figure 10:
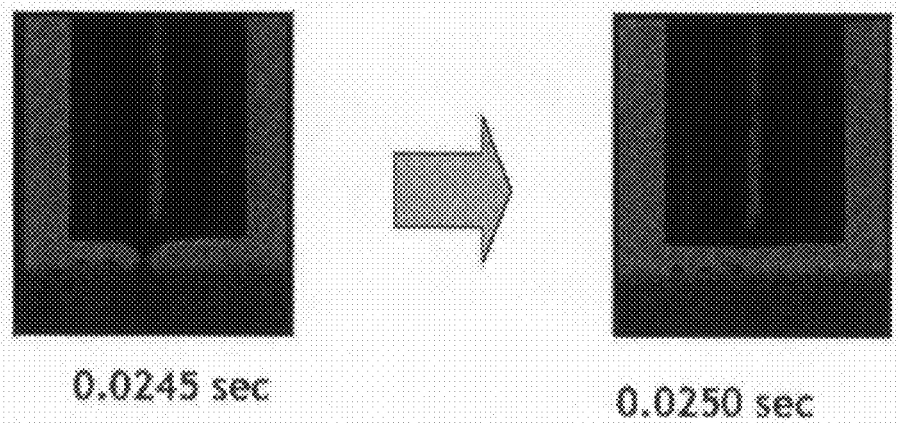
FIG. 10 illustrates a droplet dispensed using the nonconductive glass capillary nozzle of FIG. 6.

FIG. 10 illustrates a droplet dispensed using the nonconductive capillary nozzle 11 of FIG. 6. In the tip of the nonconductive capillary nozzle 11, the initial shape of the solution surface is recovered within 0.0005 seconds of the droplet discharge. Accordingly, droplets can be dispensed in a very small time interval by using the nonconductive capillary nozzle 11 having the hydrophobic tip coating portion 13 as illustrated in FIG. 6. The volume of the discharged droplet is approximately 1 nL.

Figure 11:
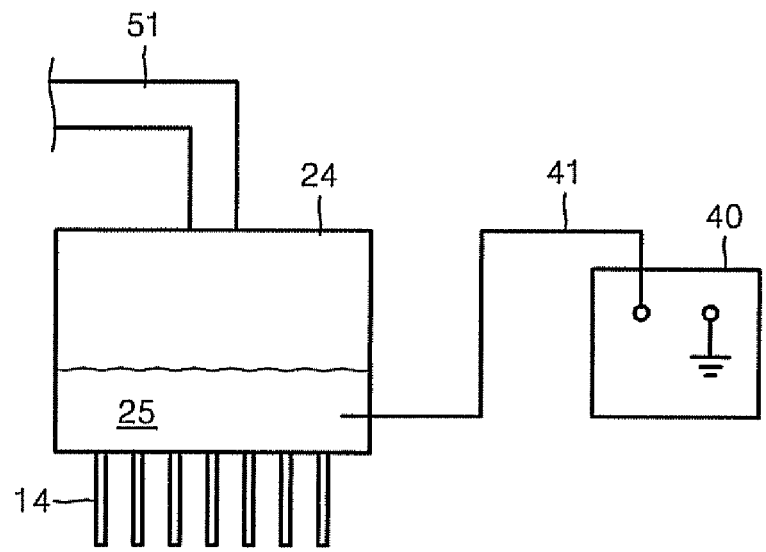
FIG. 11 is a schematic view of an exemplary droplet dispensing device having a plurality of nonconductive capillary nozzles.

FIG. 11 is a schematic view of a droplet dispensing device 104 having a plurality of nonconductive capillary nozzles according to another embodiment. The device illustrated herein, in comparison to the device 101 of FIG. 1, comprises a plurality of nonconductive capillary nozzles 14 disposed at the bottom of the a solution reservoir 24. The solution reservoir 24 also comprises an immersed electrode, which is connected with an open circuit voltage supplier 40 through a lead line 41.

When the plurality of nozzles is exposed to an electric current, it is advantageous to space the plurality of nozzles from one another by a predetermined distance to avoid negative effects that may be caused by an electric field between adjacent nozzles. However, when the plurality of nonconductive capillary nozzles 14 as described herein, the degree of integration can be significantly increased without loss of performance.

Figure 12:
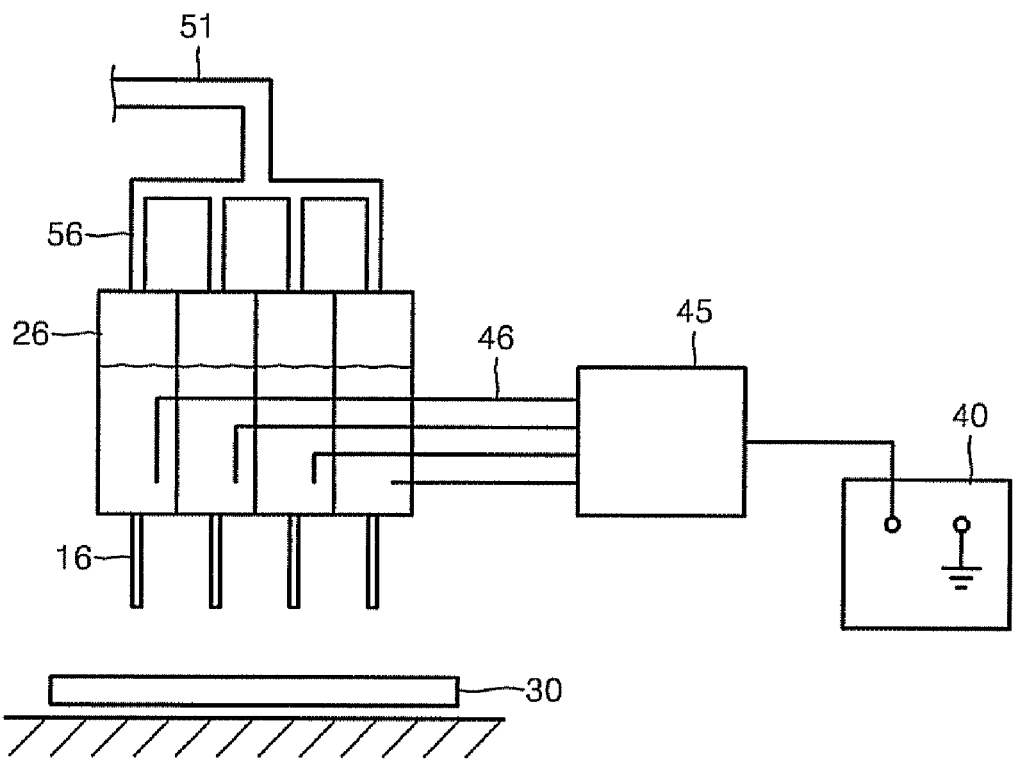
FIG. 12 is a schematic view of an exemplary droplet dispensing device having a plurality of droplet dispensing units.

FIG. 12 is a schematic view of a droplet dispensing device 105 having a plurality of droplet dispensing units according to another embodiment. In this embodiment, the droplet dispensing device comprises a plurality of droplet dispensing units capable of respectively dispensing different solutions. The droplet dispensing units each comprise a solution reservoir 26 and a nonconductive capillary nozzle 16 disposed downward from the bottom of the solution reservoir 26. The plurality of droplet dispensing units are connected to a syringe pump (not shown) through fluid tube branches 56 respectively connected to the solution reservoirs 26 and a fluid tube 51 into which the fluid tube branches 56 converge. The plurality of droplet dispensing units is connected with an open circuit voltage supplier by the immersion method. Each solution reservoir 26 may comprise an immersed electrode (not shown), and the immersed electrode may be connected with the open circuit voltage supplier 40 through a lead line 46.

The droplet dispensing device 105 may further comprise a switching unit 45 that can selectively connect the immersed electrodes with the open circuit voltage supplier 40. Therefore, the plurality of droplet dispensing units can comprise solution reservoirs 26 each comprising the same or different solutions, and may be formed as an array such that droplets are discharged in a desired pattern using the switching unit 45.

Figure 13:
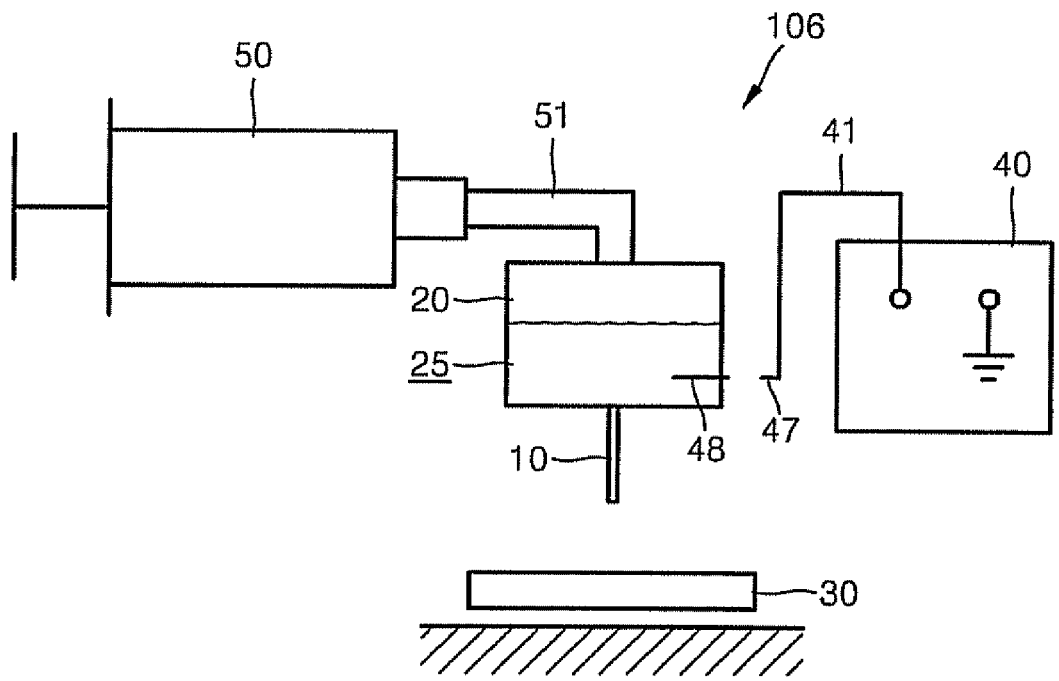
FIG. 13 is a schematic view of an exemplary droplet dispensing device having a second electrode inside and a first electrode outside a solution reservoir.

FIG. 13 is a schematic view of a droplet dispensing device 106 having a second electrode 48 inside and a first electrode 47 outside a solution reservoir 20 according to another embodiment. The first electrode 47 is connected with an open circuit voltage supplier 40 in order to apply a voltage from the open circuit voltage supplier 40 to a solution 25. The first electrode 47 and the second electrode 48 do not contact each other and are spaced from each other by a predetermined distance such that an induced electric force is generated to the second electrode 48 by the voltage applied to the first electrode 47. The first electrode 47 may be a separate electrode or an end portion of a lead line 41.

Figure 14:
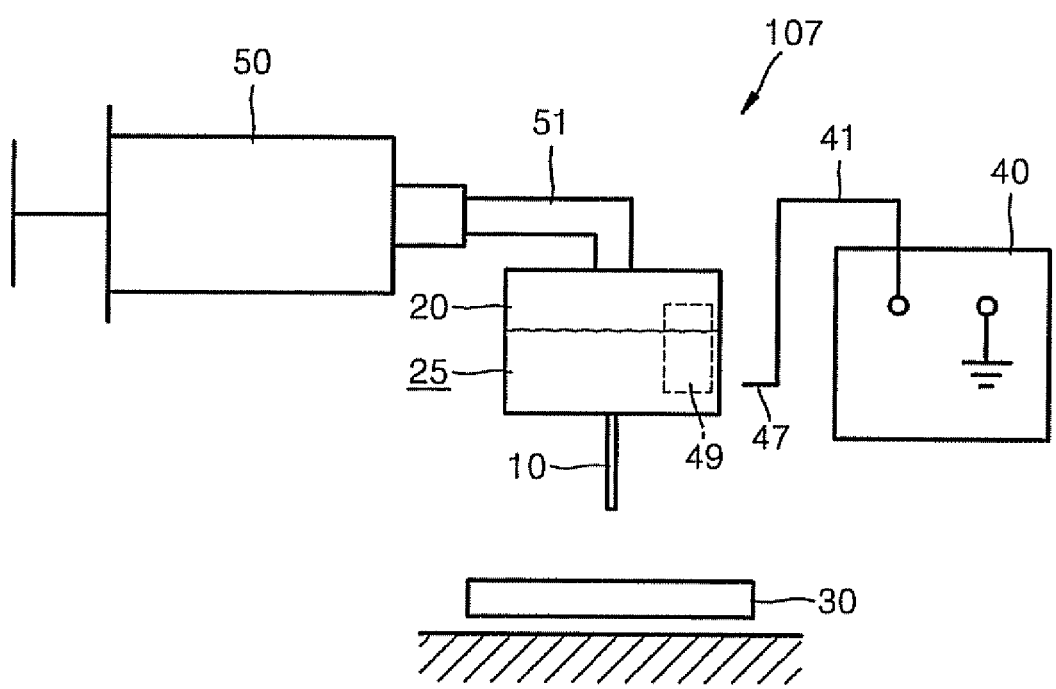
FIG. 14 is a schematic view of an exemplary droplet dispensing device having a second electrode of a large area inside and a first electrode outside a solution reservoir.

FIG. 14 is a schematic view of a droplet dispensing device 107 having a second electrode 49 of a large area inside a solution reservoir 20 and a first electrode 47 outside the solution reservoir. The second electrode 49 of a large area may be disposed in any portion that can be immersed in a solution 25 such as a sidewall or a bottom surface within the solution reservoir 20. In this case, since the area of the second electrode 49 is large, the position of the first electrode 47 can be readily determined.

In the embodiments described in FIGS. 13 and 14, a voltage is applied to the solution using an induced electric force between the first and second electrodes in a similar fashion to the embodiments of FIGS. 1, 2, 3, 11, and 12.

Hereinafter, characteristics and advantages of the ECC droplet dispensing device according to the present invention will be described in comparison to an EHD droplet dispensing device disclosed in Korean Patent No. 552705, entitled "Device and method for printing biomolecule on substrate using electrohydrodynamic effect" and assigned to Samsung electronics, Co., Ltd., which will be referred to as "552705" from hereon in.

FIGS. 15A through 15G illustrate a droplet discharged from a droplet dispensing device using EHD effect according to 552705 and FIGS. 16A through 16G illustrate a droplet discharged from the ECC droplet dispensing device of FIG. 1.

The ECC method is advantageous over the EHD method in that it is not necessary to form a lower electrode because no voltage is applied to the target member, while a voltage having a polarity opposite to a droplet discharge port is applied to a lower electrode formed in a target member in the EHD method. This difference leads to improved results in droplet dispensing using the ECC method as illustrated in FIGS. 15 and 16.

Figure 15:
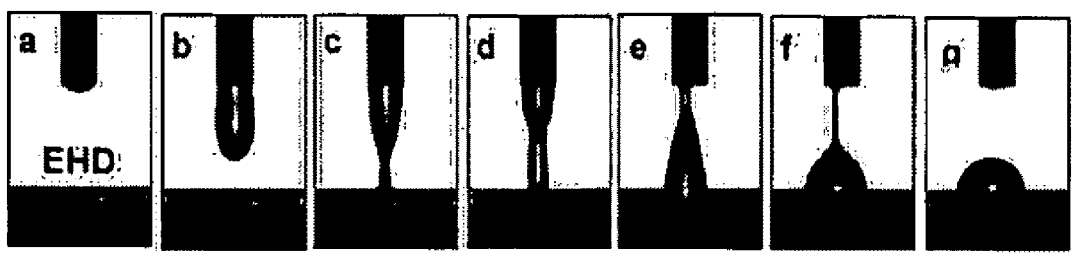
FIGS. 15A through 15G illustrate a droplet discharged from a droplet dispensing device using an electrohydrodynamic (EHD) effect according to a related art.
Figure 16:
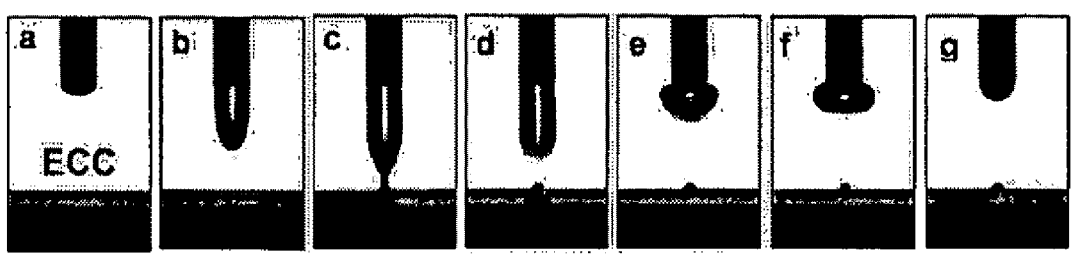
FIGS. 16A through 16G illustrate a droplet discharged from the ECC droplet dispensing device of FIG. 1.

A droplet formed in each nozzle has the same initial volume, and the same voltage is applied to each nozzle in the embodiments illustrated in FIGS. 15 and 16. A steel plate with a thickness of 100 μm coated with a polymethyl methacrylate (PMMA) with a thickness of 5 μm is disposed as a target member on an insulated stage, and the distance between the nozzle and the target member is 2.0 mm. As a result, the volume of the discharged droplet is 133 nL when using the EHD droplet dispensing device and 791 pL while using the ECC droplet dispensing device. While not wishing to be bound by theory, it is believed that this difference is due to different droplet formation mechanisms. For the EHD method, the droplet forming mechanism may be divided into two stages: droplet elongation by an electric force and breakup of a liquid bridge with the assistance of electrowetting tension. Because of the electrowetting tension, it takes a longer time to sustain the liquid bridge between the nozzle and the target (61.5 millisecond (ms), refer to FIGS. 15C through 15F). On the other hand, the time to maintain the liquid bridge for the ECC method is shorter (1 ms, refer to FIG. 16C) even though the ECC method comprises a similar two-stage mechanism. This is due to the latter stage of the mechanism, which is the breakup of the liquid bridge with the assistance of charge neutralization occurring nearly simultaneously with the forming of liquid bridge in the case of the ECC method.

Figure 17:
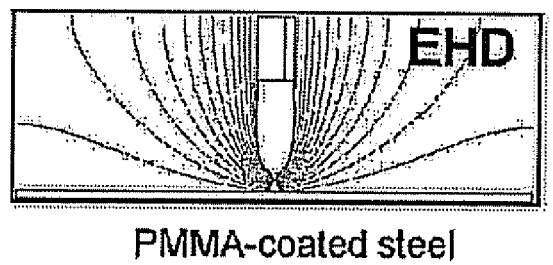
FIG. 17 is an equipotential line illustrating voltage distribution between a nozzle and a target member when a liquid bridge is formed in FIG. 15.
Figure 18:
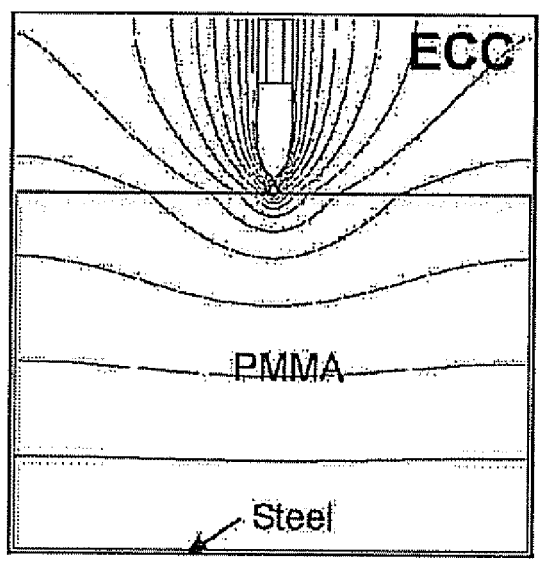
FIG. 18 is an equipotential line illustrating voltage distribution between a nozzle and a target member when a liquid bridge is formed in FIG. 16.
Figure 19:
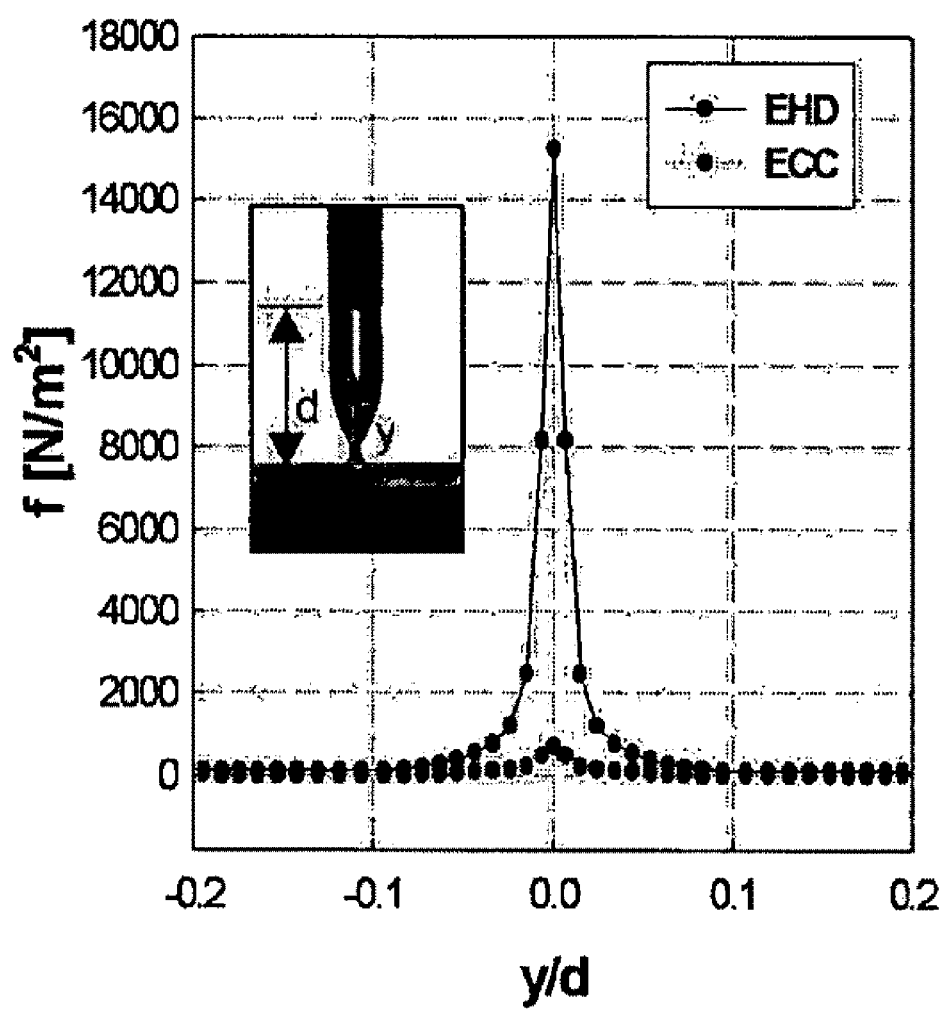
FIG. 19 is a graph illustrating an electric stress perpendicular to a droplet surface calculated along a surface of the droplet from a surface of the target member of FIGS. 17 and 18.

FIG. 17 is an equipotential line illustrating voltage distribution between a nozzle and a target member when a liquid bridge is formed in FIG. 15 and FIG. 18 is an equipotential line illustrating voltage distribution between a nozzle and a target member when a liquid bridge is formed in FIG. 16. Potential distribution when the liquid bridge is formed between the droplet and the target member is different between the EHD method and the ECC method, as illustrated in FIGS. 17 and 18. FIG. 19 is a graph illustrating electric stress perpendicular to a droplet surface calculated along a surface of the droplet from a surface of the target member in FIGS. 17 and 18. The electric stress drastically increases toward the target member in the EHD method, and the increased value is 22 times larger than that in the ECC method. Thus the droplet contacting the target member is elongated more rapidly using the EHD method resulting in a larger volume.

Accordingly, the ECC droplet dispensing device can dispense a smaller droplet when compared with the EHD droplet dispensing device disclosed in 552705. Also, the solution surface can be recovered to its initial shape more quickly because of the short time needed to maintain the liquid bridge.

Figure 20:
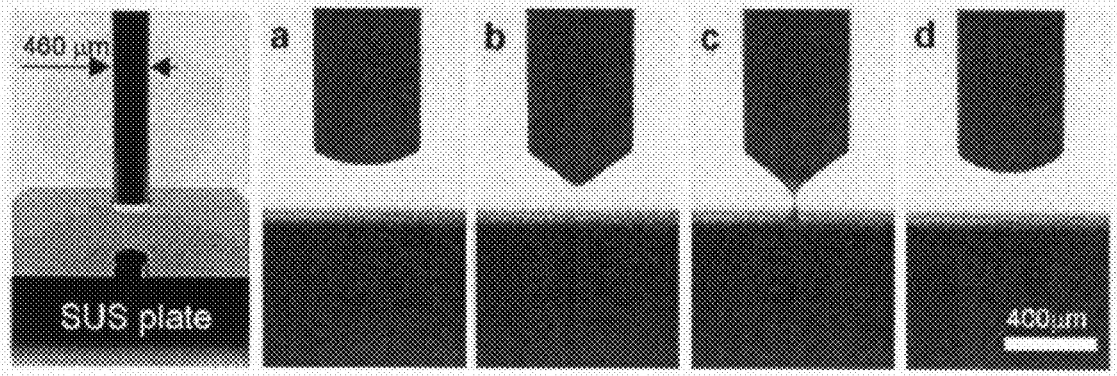
FIG. 20 illustrates droplets dispensed on a target member having a conductive surface using the droplet dispensing device of FIG. 1.
Figure 21:
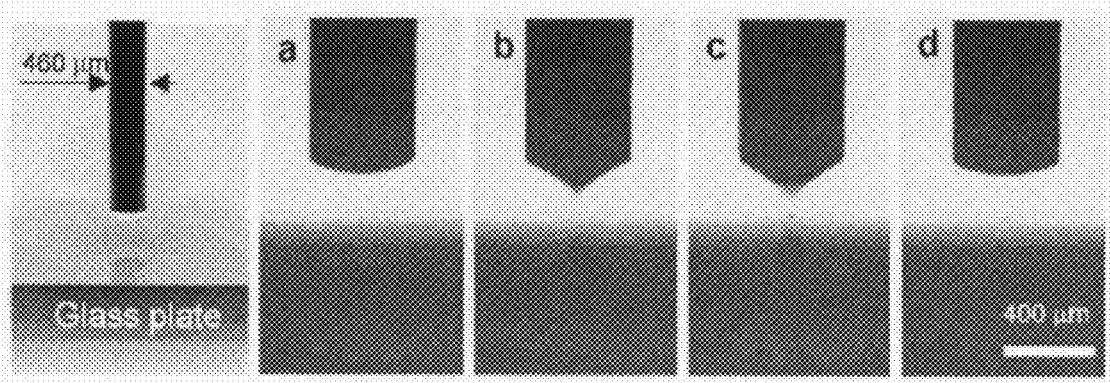
FIG. 21 illustrates droplets dispensed on a target member having an insulating surface using the droplet dispensing device of FIG. 1.
Figure 22:
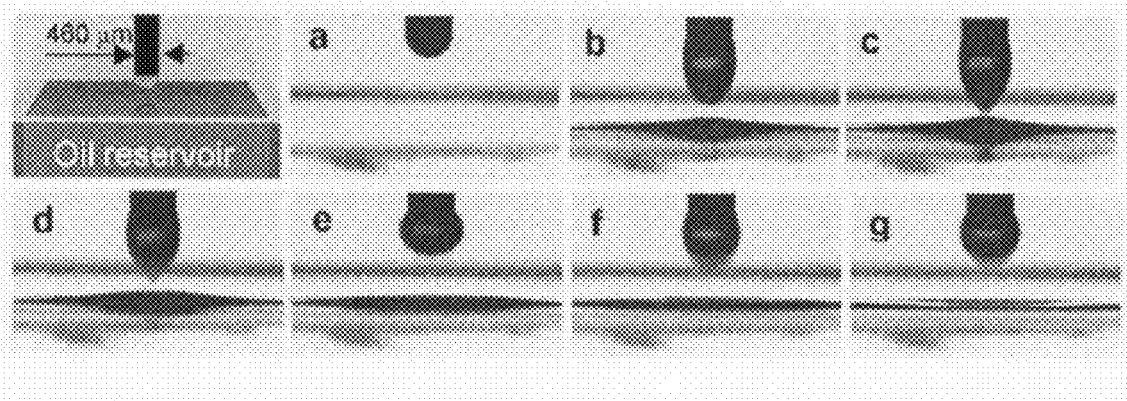
FIG. 22 illustrates droplets dispensed on a target member having a fluidic surface using the droplet dispensing device of FIG. 1.

One of the advantages of the ECC method is to dispense a droplet regardless of the properties of the target member. FIGS. 20 through 22 are views illustrating droplets dispensed on target members having conductive, insulating, and fluidic surfaces using the device illustrated in FIG. 1, respectively. A nozzle with a diameter of 460 μm is used. FIG. 20 illustrates a droplet dispensed on a conductive target member formed of stainless steel. A droplet having a volume of 17 pL remains on the stainless steel plate. FIG. 21 illustrates a droplet dispensed on a target member in the form of a glass plate. A droplet of 5 pL remains on the glass plate. FIG. 22 illustrates a droplet dispensed on a target member having a silicon oil surface. When a voltage is applied to the nozzle, a droplet formed in the nozzle is elongated toward the oil surface, and the surface rises toward the droplet at the same time. After they contact each other, a small droplet is integrated into the oil, and the oil surface as well as the droplet formed in the nozzle move up and down.

Figure 23:
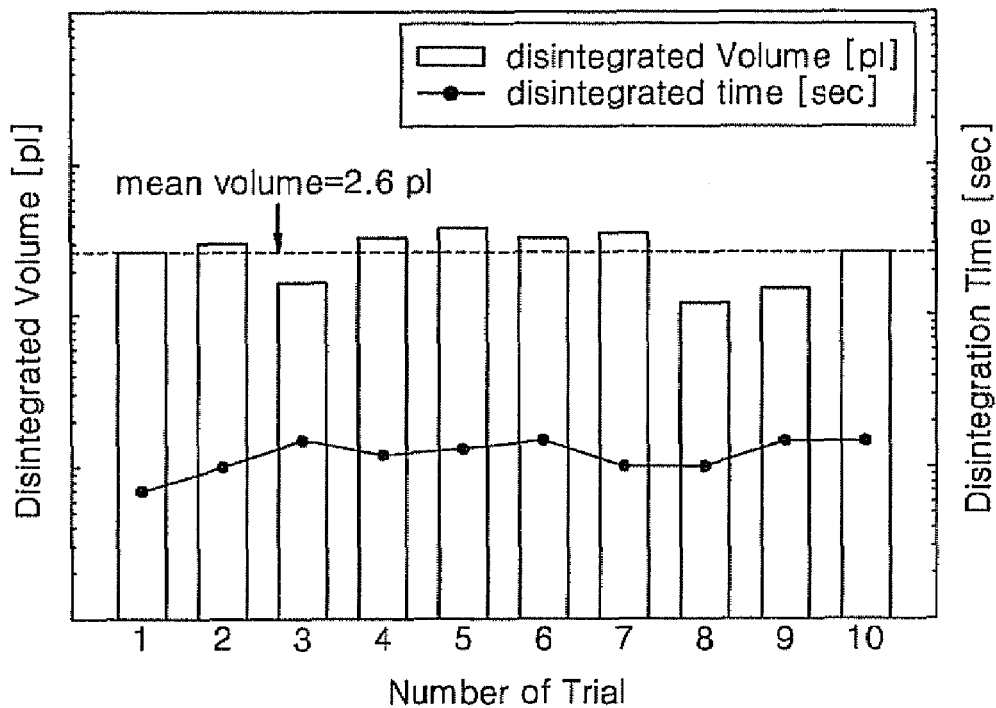
FIG. 23 is a graph illustrating the distribution of droplet volumes of a DNA solution dispensed by the droplet dispensing device of FIG. 1.

FIG. 23 is a graph illustrating distribution of droplet volumes of a DNA solution repeatedly dispensed by the droplet dispensing device illustrated in FIG. 1. For example, a 20 micromolar (μM) DNA solution with a buffer (pH 10) is dispensed on a glass plate. The distance between the nozzle and the glass plate is 274 μm. After dispensing 10 droplets, the average values of the disintegrated volume and of the disintegration time is 2.6 pL (standard_deviation of 0.9 pL) and 122 ms, respectively. Therefore, the droplet dispensing device can be advantageously applied to bio-fluids.

Figure 24:
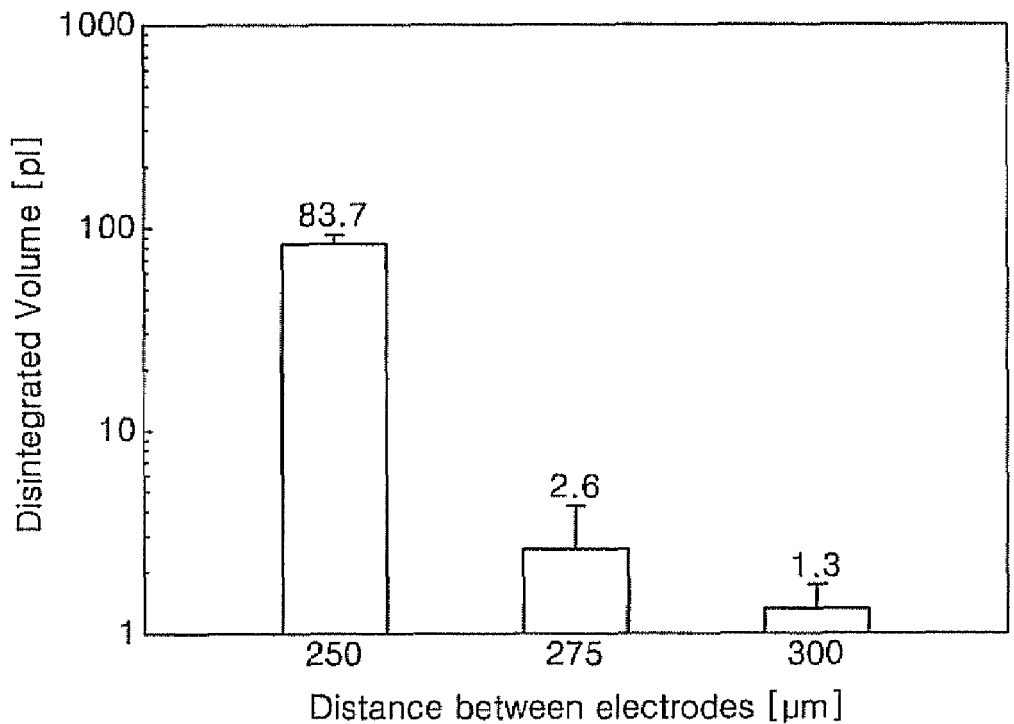
FIG. 24 is a graph illustrating the change in droplet volume depending on the distance between the nozzle and the target member.

FIG. 24 is a graph illustrating change in droplet volume depending on the distance between the nozzle and the target member. As the distance between the nozzle tip and the target member increases, the volume of the separated droplet drastically decreases. Therefore, the distance between the nozzle tip and the target member may be one of key factors that determine the integration volume.

Figure 25:
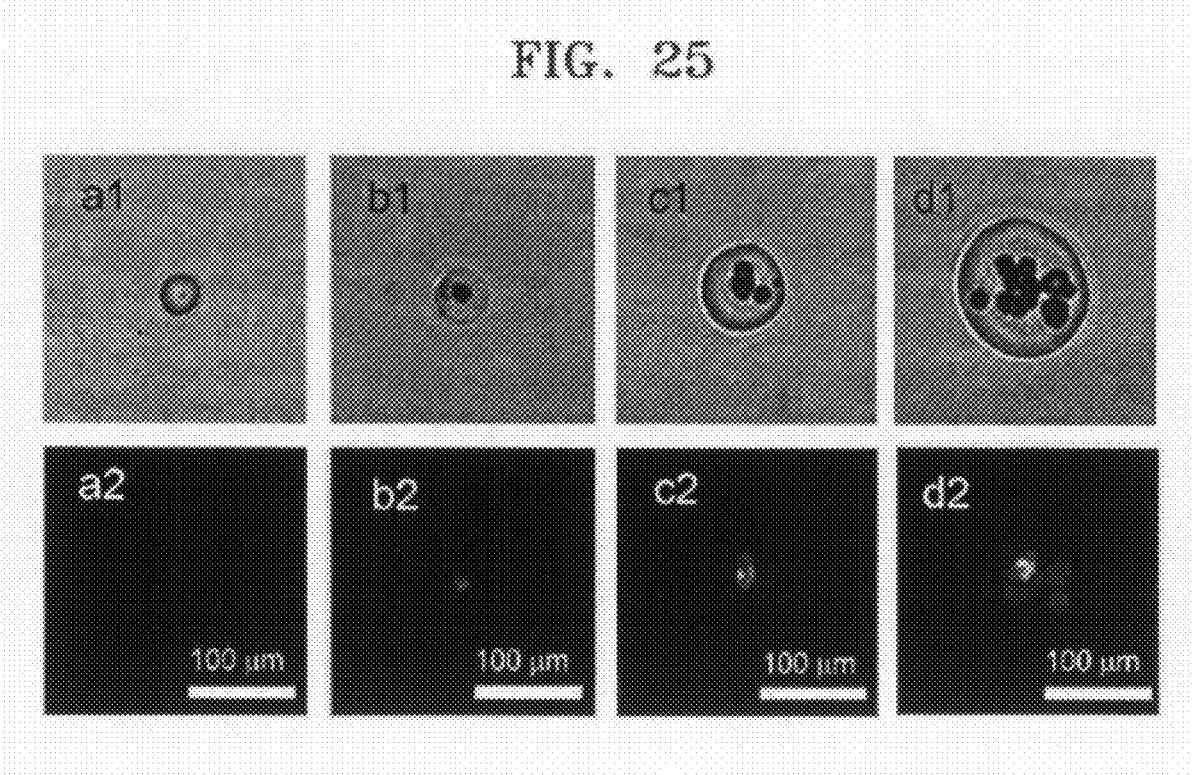
FIG. 25 illustrates phase contrast microscopic images of cell solution droplets of various volumes dispensed by the droplet dispensing device of FIG. 1, and fluorescent images corresponding to the contrast microscopic images.

FIG. 25 shows phase contrast microscopic images of cell solution droplets of various volumes dispensed by the droplet dispensing device illustrated in FIG. 1 and fluorescent images corresponding to the images. Cell dispensing is one of several key requirements for the effective use of cell-based assays in high-throughput screening. Traditional and flow-through liquid handlers may be destructive to living cells, and have problems with contamination and clogging of flow paths. The ECC droplet dispensing device can dispense a living cell without contamination and clogging of flow paths. Lung epithelial cells (A549, 2×106 cells/mL) are prepared in the presence of CellTracker™ Red CMTPX probes (Invitrogen™) that freely diffuse into living cells. Once inside the cell, these probes react with intracellular components to produce cells that are both fluorescent and viable. In FIG. 25, a1, b1, c1, and d1 are images obtained using a phase contrast microscope, and a2, b2, c2, and d2 are fluorescent images corresponding thereto. As shown in FIG. 25, the number of dispensed cells can be controlled by adjusting the volume of the droplet using the ECC droplet dispensing device, and the cells are viable after being dispensed.

The droplet dispensing device having the nonconductive capillary nozzle can uniformly discharge fine droplets in response to an electrical control signal using the immersed electrode and the nonconductive capillary nozzle.

In addition, the droplet dispensing device can regularly maintain the shape of the droplet surface in the tip of the nozzle without a separate driving device by preventing the influence of gravity on the capillary nozzle and supplying the solution by capillary force. Therefore, the droplet dispensing device can easily control the volume of a fine droplet and dispense droplets in a small time interval when compared to a conventional droplet dispensing device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A droplet dispensing device comprising:
a nonconductive capillary nozzle disposed in a downward direction;
a pump connected with the nonconductive capillary nozzle through a hermetically sealed fluid tube and generating a negative pressure to decrease the influence of gravity on a solution within the nonconductive capillary nozzle and the fluid tube;
a second electrode immersed in the solution; the second electrode applying a voltage to the solution; and
a first electrode disposed outside the fluid tube and connected with an open circuit voltage supplier to generate an induced electric force to the second electrode.

2. The droplet dispensing device of claim 1, wherein the second electrode is immersed in the solution within the fluid tube.

3. The droplet dispensing device of claim 1, further comprising a solution reservoir between the fluid tube and the nonconductive capillary nozzle.

4. The droplet dispensing device of claim 3, wherein the second electrode is immersed in the solution within the solution reservoir.

5. The droplet dispensing device of claim 1, wherein at least an inner wall of the nonconductive capillary nozzle is hydrophilic.

6. The droplet dispensing device of claim 1, wherein at least an inner wall of the nonconductive capillary nozzle is hydrophilic and a tip portion of the nonconductive capillary nozzle comprises a tip coating portion formed of a hydrophobic material.

7. The droplet dispensing device of claim 1, wherein the pump is a syringe pump.

8. The droplet dispensing device of claim 1, wherein the second electrode is disposed in the nonconductive capillary nozzle.

9. The droplet dispensing device of claim 1, wherein an inside diameter of the fluid tube is larger than an inside diameter of the nonconductive capillary nozzle.

10. A droplet dispensing device comprising:
a solution reservoir;
at least one nonconductive capillary nozzle disposed in a downward direction with respect to the solution reservoir;
a pump connected the solution reservoir through a hermetically sealed fluid tube and generating a negative pressure to decrease the influence of gravity on a solution within the nonconductive capillary nozzle and the solution reservoir;
a Second electrode immersed in the solution; the second electrode applying a voltage to the solution; and a first electrode disposed outside the fluid tube and connected with an open circuit voltage supplier to generate an induced electric force to the second electrode.

11. The droplet dispensing device of claim 10, wherein the second electrode immersed is in the solution within the solution reservoir.

12. The droplet dispensing device of claim 10, wherein at least an inner wall of the nonconductive capillary nozzle is hydrophilic.

13. The droplet dispensing device of claim 10, wherein at least an inner wall of the nonconductive capillary nozzle is hydrophilic and a tip portion of the nonconductive capillary nozzle comprises a tip coating portion formed of a hydrophobic material.

14. The droplet dispensing device of claim 10, wherein the pump is a syringe pump.

15. A droplet dispensing device comprising:
 a plurality of droplet dispensing units, each droplet dispensing unit comprising:
  a solution reservoir; and
  a nonconductive capillary nozzle disposed in a downward direction with respect to the droplet dispensing units;
 a pump connected the solution reservoirs through a hermetically sealed fluid tube and generating a negative pressure to decrease the influence of gravity on solutions within the droplet dispensing units
 a plurality of second electrodes immersed in the solution within the solution reservoirs; the second electrode applying a voltage to the solution within the solution reservoirs; and
 a plurality of first electrodes disposed outside the solution reservoirs, and connected with an open circuit voltage supplier to generate an induced electric force to the second electrodes.

16. The droplet dispensing device of claim 15, further comprising a switching unit selectively connecting some of the first electrodes with the open circuit voltage supplier.

17. The droplet dispensing device of claim 15, wherein at least inner walls of the nonconductive capillary nozzles are hydrophilic.

18. The droplet dispensing device of claim 15, wherein at least the inner walls of the nonconductive capillary nozzles are hydrophilic and each of the tip portions of the nonconductive capillary nozzles comprises a tip coating portion formed of a hydrophobic material.

19. The droplet dispensing device of claim 15 wherein the pump is a syringe pump.

\* \* \* \* \*